United States Patent Office 3,052,691
Patented Sept. 4, 1962

3,052,691
POLYFLUORINATED HETEROCYCLIC SULFIDES
Carl G. Krespan, Wilmington, Del., assignor to E. I. du Pont de Nemours and Company, Wilmington, Del., a corporation of Delaware
No Drawing. Filed Apr. 24, 1959, Ser. No. 808,585
18 Claims. (Cl. 260—327)

This invention relates to new fluorine-containing heterocyclic compounds. More particularly, it relates to highly fluorinated, unsaturated cyclic sulfides.

This application is a continuation-in-part of my application Serial No. 742,715, filed June 18, 1958, and now abandoned.

In spite of the continuously increasing technical importance of fluorinated organic compounds, only very few fluorine-containing heterocyclic structures are known. In particular, there are no published reports of unsaturated cyclic sulfides having highly fluorinated substituents. More particularly, there are no known cyclic sulfides containing intracyclic unsaturation and in which every ring carbon atom bears a polyfluoroalkyl substituent. The term "polyfluoroalkyl" is used here for the sake of brevity to denote an alkyl group containing only carbon and fluorine and, optionally, one and only one other atom, which can be hydrogen or chlorine, this single atom, when the polyfluoroalkyl group has more than one carbon atom, being attached to the omega-carbon atom, that is, the carbon atom furthest removed from the ring carbon atom. Thus, the term "polyfluoroalkyl" as used here includes perfluoroalkyl, ω-hydroperfluoroalkyl and ω-chloroperfluoroalkyl.

It is an object of this invention to provide new fluorine-containing heterocyclic compounds and a novel process for their preparation. A further object is to provide highly fluorinated, unsaturated cyclic compounds. A still further object is to provide a novel process for effecting a direct combination of sulfur with a bis(polyfluoroalkyl)acetylene compound. Other objects will appear hereinafter.

These and other objects of this invention are accomplished by providing novel unsaturated heterocyclic polyfluorinated sulfides having the general formula

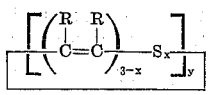

wherein $x$ and $y$ are cardinal numbers from 1 to 2, $y$ is not greater than $x$, and each R is a polyfluoroalkyl radical, i.e., a perfluoroalkyl, ω-hydroperfluoroalkyl or ω-chloroperfluoroalkyl radical. The new products of this invention are unsaturated heterocyclic compounds containing as ring members only carbon and sulfur, wherein each ring carbon atom is doubly bonded to an adjacent ring carbon and bears a polyfluoroalkyl substituent.

The novel products of this invention as defined by the above formula embrace three, and only three, classes of intracyclically unsaturated heterocyclic sulfides. These three classes are the following, the symbol R in all formulas representing a polyfluoroalkyl radical which can be the same or different and of any chain length but generally of not more than 12 carbon atoms and preferably of 1 to 6 carbon atoms:

(1) When $x$ is 1, and $y$ therefore is also 1, the compounds are the tetrakis(polyfluoroalkyl)thiophenes,

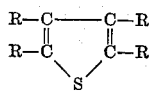

(2) When $x$ is 2, and $y$ is 1, the compounds are the 1,2-dithia-3,4-bis(polyfluoroalkyl)cyclobut-3-enes,

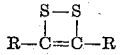

These products can also be called bis(polyfluoroalkyl)-1,2-dithietenes.

(3) When $x$ is 2, and $y$ is 2, the compounds are the 1,2,5,6-tetrathia-3,4,7,8-tetrakis(polyfluoroalkyl)-cyclo-octa-3,7-dienes.

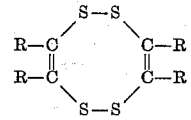

It will be noted that these compounds are the dimers of the compounds of Formula 2.

This invention includes a novel process for preparing these new cyclic sulfides which comprises heating, at a temperature of at least 150° C., a mixture of sulfur and a bis(polyfluoroalkyl)acetylene of the formula

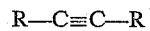

where the R's are polyfluoroalkyl groups, i.e., perfluoroalkyl, ω-hydroperfluoroalkyl or ω-chloroperfluoroalkyl groups which can be similar or different and can be of any chain length but generally are not more than 12 carbon atoms and preferably of 1 to 6 carbon atoms. This reaction yields directly the compounds of the types (1) and (2) above, i.e., the tetrakis(polyfluoroalkyl)thiophenes and the bis(polyfluoroalkyl)-1,2-dithietenes, both of which are generally produced in varying proportions. Compounds of type (3) above are not normally obtained directly in this reaction, or at least not in significant amounts. They are, however, obtained indirectly by the same process since the bis(polyfluoroalkyl)-1,2-dithietenes dimerize spontaneously on standing, e.g., after a few weeks at room temperature, to give the 1,2,5,6-tetrathia-3,4,7,8-tetrakis(polyfluoroalkyl)cycloocta-3,7-dienes.

The bis(polyfluoroalkyl)acetylenes which serve as starting materials are obtainable as follows: The bis(perfluoroalkyl)acetylenes may be prepared by the process described in U.S. Patent 2,546,997. The bis(ω-hydroperfluoroalkyl)acetylenes can be prepared by reacting an ω-hydroperfluorocarboxylic acid chloride with 1,1-dichloro-2,2-difluoroethylene at 140–150° C. in the presence of nickel carbonyl catalyst, whereby carbon monoxide and chlorine are removed from the acid chloride and addition takes place to give an α,α′-dichloro-ω,ω′-dihydroperfluoroalkene of the formula

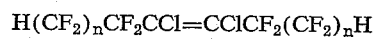

On removal of chlorine from the dichloroolefin, e.g., by treatment with magnesium in tetrahydrofuran medium or with zinc in acetic anhydride, there is obtained the bis(ω-hydroperfluoroalkyl)acetylene,

The first member of this series of compounds, bis(difluoromethyl)acetylene, is described in U.S. Patent 2,558,875.

The bis(ω-chloroperfluoroalkyl)acetylenes are prepared from the α,α,α,ω-tetrachloroperfluoroalkanes of the type $Cl(CF_2)_nCCl_3$, which are themselves made by telomerization of tetrafluoroethylene with carbon tetrachloride. Upon treatment with copper or with zinc activated with copper in ether, the $a,a,a,\omega$-tetrachloroperfluoroalkane couples with loss of chlorine to yield the corresponding tetrachloroperfluoroolefin,

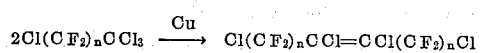

The tetrachloroperfluoroolefin is then dehalogenated by treatment with magnesium in tetrahydrofuran or with zinc in acetic anhydride to give the bis(ω-chloroperfluoroalkyl)acetylene, Cl(CF$_2$)$_n$C≡C(CF$_2$)$_n$Cl. The first member of this series of compounds, bis(chlorodifluoromethyl)acetylene, is described in U.S. Patent 2,522,566.

The most accessible bis(polyfluoroalkyl)acetylenes are those in which the polyfluoroalkyl groups have from 1 to 12 carbon atoms, and particularly those in which these groups have from 1 to 6 carbon atoms. Accordingly, the preferred products of the invention are those, having the Formulas 1, 2 and 3 shown above, in which the polyfluoroalkyl groups have from 1 to 12 carbon atoms, the most useful ones being those in which the polyfluoroalkyl groups have from 1 to 6 carbon atoms. Typical reactants suitable for use in the present invention include hexafluorobutyne-2, CF$_3$—C≡C—CF$_3$; octafluoropentyne-2, CF$_3$—C≡C—CF$_2$—CF$_3$; perfluorohexyne-3,

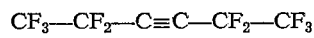

perfluorohexyne-2, CF$_3$—C≡C—CF$_2$—CF$_2$—CF$_3$; perfluorononyne-2, CF$_3$—C≡C—(CF$_2$)$_5$—CF$_3$; perfluoropentadecyne-2, CF$_3$—C≡C—(CF$_2$)$_{11}$—CF$_3$; bis(difluoromethyl)acetylene, HCF$_2$—C≡C—CF$_2$H; bis(ω-hydroperfluoroundecyl)acetylene, H(CF$_2$)$_{11}$—C≡C(CF$_2$)$_{11}$H; bis(chlorodifluoromethyl)acetylene, ClCF$_2$C≡CCF$_2$Cl; bis(ω-chloroperfluorohexyl)acetylene,

bis(ω-chloroperfluorododecyl)acetylene,

Cl(CF$_2$)$_{12}$C≡C(CF$_2$)$_{12}$Cl and the like.

Among the heterocyclic sulfides which can be obtained by the process of this invention the following may be mentioned, in addition to those illustrated in the examples which follow:

From octafluoropentyne-2: bis(trifluoromethyl)-bis(pentafluoroethyl)thiophene; 3-trifluoromethyl-4-pentafluoroethyl-1,2-dithietene; and 1,2,5,6-tetrathia-bis(trifluoromethyl)-bis(pentafluoroethyl)cycloocta-3,7-diene.

From perfluorohexyne-3: tetrakis(pentafluoroethyl)thiophene; bis(pentafluoroethyl)-1,2-dithietene; and 1,2,5,6 - tetrathia-3,4,7,8-tetrakis(pentafluoroethyl)cycloocta-3,7-diene.

From perfluorohexyne-2: bis(trifluoromethyl)-bis(perfluoropropyl)thiophene; 3 - trifluoromethyl - 4-perfluoropropyl-1,2-dithietene; and 1,2,5,6-tetrathia-bis(trifluoromethyl)-bis(perfluoropropyl)cycloocta-3,7-diene.

From perfluorononyne-2: bis(trifluoromethyl)-bis(perfluorohexyl)thiophene; 3 - trifluoromethyl - 4-perfluorohexyl-1,2-dithietene; and 1,2,5,6-tetrathia-bis(trifluoromethyl)-bis(perfluorohexyl)cycloocta-3,7-diene.

From perfluoropentadecyne-2: bis(trifluoromethyl)-bis(perfluorododecyl)thiophene; 3-trifluoromethyl-4-perfluorododecyl-1,2-dithietene; and 1,2,5,6-tetrathia-bis(trifluoromethyl)-bis(perfluorododecyl)cycloocta-3,7-diene.

From bis(difluoromethyl)acetylene: tetrakis(difluoromethyl)thiophene; bis(difluoromethyl)-1,2-dithietene; and 1,2,5,6 - tetrathia - 3,4,7,8 - tetrakis(difluoromethyl)cycloocta-3,7-diene.

From bis(ω-hydroperfluoroundecyl)acetylene: tetrakis(ω - hydroperfluoroundecyl)thiophene; bis(ω - hydroperfluoroundecyl)-1,2-dithietene; and 1,2,5,6-tetrathia-3,4,7,8-tetrakis(ω-hydroperfluoroundecyl)cycloocta-3,7-diene.

From bis(chlorodifluoromethyl)acetylene: tetrakis(chlorodifluoromethyl)thiophene; bis(chlorodifluoromethyl)-1,2-dithietene; and 1,2,5,6-tetrathia-3,4,7,8-tetrakis(chlorodifluoromethyl)cycloocta-3,7-diene.

From bis(ω-chloroperfluorohexyl)acetylene: tetrakis(ω - chloroperfluorohexyl)thiophene; bis(ω - chloroperfluorohexyl)-1,2-dithietene; and 1,2,5,6-tetrathia-3,4,7,8-tetrakis(ω-chloroperfluorohexyl)cycloocta-3,7-diene.

From bis(ω-chloroperfluorododecyl)acetylene: tetrakis(ω - chloroperfluorododecyl)thiophene; bis(ω - chloroperfluorododecyl)-1,2-dithietene; and 1,2,5,6-tetrathia-3,4, 7,8 - tetrakis(ω - chloroperfluorododecyl)cycloocta - 3,7-diene.

It will be noted that, when the starting bis-(polyfluoroalkyl)acetylene is unsymmetrical, i.e., when the polyfluoroalkyl groups attached to the triply bonded carbon atoms are different, position isomers can be formed in the cases of the thiophene structure and of the 1,2,5,6-tetrathiacyclooctadiene structure. Thus, the respective polyfluoroalkyl groups can be attached to either of the two adjacent, doubly bonded carbon atoms in these structures.

The reaction between sulfur and the bis(perfluoroalkyl)acetylene is impractically slow at temperatures below about 150° C. It is therefore desirable to heat the reactants at a temperature of at least 150° C. The temperature can be as high as desired below the decomposition point of the organic reactant and reaction products but, in general, it is unnecessary to exceed substantially the boiling point of sulfur at atmospheric pressure, which is about 445° C. Thus, the useful temperature range is that between 150 and 475° C., and the preferred range is between 175 and 450° C. The reaction can be carried out in various ways. For example, the bis(polyfluoroalkyl)acetylene can be heated with sulfur in sealed vessels under the autogenous pressure developed at the temperature used, or, if desired, under higher pressures, e.g., up to 5000 atmospheres; or vapors of the bis(polyfluoroalkyl)acetylene can be bubbled through molten sulfur, at atmospheric or higher pressures. A particularly convenient way of carrying out the reaction consists in passing the bis(polyfluoroalkyl)acetylene, either as a gas or as a liquid, through vapors of boiling sulfur at or near atmospheric pressure. When this last procedure is used, the reaction product is in general exclusively, or nearly exclusively, the bis(polyfluoroalkyl)-1,2-dithietene.

The relative proportions of the two reactants are not critical. They are of importance only insofar as it is desired to utilize as completely as possible the more expensive organic reactant. For this reason, it is generally desirable to use at least one mole of sulfur per mole of bis(polyfluoroalkyl)acetylene. A large excess of sulfur, e.g., up to 10 moles or more per mole of bis(polyfluoroalkyl)acetylene, can be used.

The reaction proceeds without the use of an added catalyst. If desired, however, iodine can be added to the reaction mixture, for example in amounts between 0.05 and 0.25 mole per mole of sulfur. When iodine is present, comparable yields of cyclic sulfides can be obtained at a somewhat lower temperature than in the absence of iodine. It is possible that iodine forms transitorily a diiodo addition product of the fluoroalkyne, since such addition products are occasionally found among the reaction products and since the cyclic sulfides of this invention can also be obtained by reacting sulfur with the preformed diiodo bis(polyfluoroalkyl)acetylene of the formula R—CI═CI—R where each R is a polyfluoroalkyl radical.

No solvent or diluent is necessary, but if desired there can be used an inert organic liquid medium, preferably one that dissolves sulfur at least to some extent, for example, benzene.

In addition to the tetrakis(polyfluoroalkyl)thiophenes and the bis(polyfluoroalkyl)-1,2-dithietenes, there is sometimes formed in the reaction another cyclic sulfide, whose composition is that of an addition product of one mole of the bis(polyfluoroalkyl)acetylene to two moles of the bis(polyfluoroalkyl)-1,2-dithietene. These products are bicyclic sulfides having the structure of a 1,4,5,8-tetrathiabicyclo[4.4.0]2,3,6,7,9,10 - hexakis(polyfluoroalkyl)deca-2,6-diene,

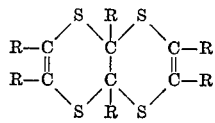

where the R's are polyfluoroalkyl radicals as defined above.

The various cyclic sulfides formed directly in the reaction of sulfur with the bis(polyfluoroalkyl)acetylene can be isolated simply by fractional distillation of the reaction product, since they are stable liquids having widely different boiling points. Other known separation methods such as low temperature crystallization, steam distillation, solvent extraction from excess sulfur, etc. can be used.

As already noted, the 1,2,5,6-tetrathia-3,4,7,8-tetrakis(polyfluoroalkyl)cycloocta-3,7-dienes are obtained simply by allowing the 1,2-dithia-3,4-bis(polyfluoroalkyl)-cyclobut-3-enes to stand at room temperature for a prolonged period of time, or more rapidly at elevated temperature. These products are crystalline solids which can readily be separated from the non-dimerized liquid material and purified by recrystallization from appropriate solvents.

The following examples illustrate the invention:

*Example I*

A mixture of 6.4 g. (0.20 mole) of sulfur, 30 g. (0.19 mole) of hexafluorobutyne-2 and 12.7 g. (0.05 mole) of iodine was heated at 200° C. for 6 hours in an agitated pressure vessel under the autogenous pressure developed by the reactants at that temperature. The liquid reaction product (42 g.) was given a preliminary distillation. The individual fractions were then shaken with mercury to remove the last traces of free iodine, and redistilled. In this way the following compounds were isolated:

(A) 5.8 g. (26% conversion based on the sulfur) of 1,2-dithia - 3,4 - bis(trifluoromethyl)cyclobut-3-ene, or bis(trifluoromethyl)-1,2-dithietene,

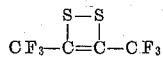

a yellow liquid boiling at 91–92° C. at 760 mm.

*Anal.*—Calc'd for $C_4F_6S_2$: C, 21.24; F, 50.40; S, 28.36. Found: C, 21.41; F, 51.01; S, 28.65.

(B) 3.8 g. (11% conversion based on the sulfur) of tetrakis(trifluoromethyl)thiophene,

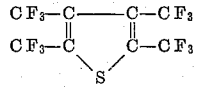

B.P. 130–131° C. at 760 mm.

*Anal.*—Calc'd for $C_8F_{12}S$: C, 26.98; F, 64.02; S, 9.01. Found: C, 26.33; F, 61.59; S, 9.05.

(C) 8.9 g. (20% conversion based on the sulfur) of 1,4,5,8-tetrathiabicyclo[4.4.0]-2,3,6,7,9,10 - hexakis - (trifluoromethyl)deca-2,6-diene,

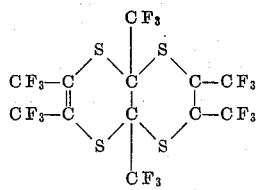

B.P., 97–99° C. at 14 mm.

*Anal.*—Calc'd for $C_{12}F_{18}S_4$: C, 23.46; F, 55.67; S, 20.88; M.W., 614. Found: C, 23.93; F, 55.92; S, 20.58; M.W., 612–620.

For each of the above compounds, the assigned structures were further established by the evidence of infrared and nuclear magnetic resonance spectra.

In addition to the above-described perfluorocyclic sulfides, there was also obtained 8 g. of hexafluorobutyne-2 diiodide, or 1,1,1,4,4,4-hexafluoro-2,3-diiodo-2-butene, $CF_3$—CI=CI—$CF_3$, B.P., 63–71° C. at 44 mm.

*Example II*

Upon standing for about 8 weeks at room temperature of about 20° C., a sample of the bis(trifluoromethyl)-1,2-dithietene of Example I crystallized partially to a yellow solid. This solid was separated from the unchanged liquid by decantation, dried and sublimed by heating at 80–100° C. at atmospheric pressure. The sublimate melted at 110–111° C. Elemental analysis and molecular weight determination showed that it was a dimer of bis(trifluoromethyl)-1,2-dithietene, and infrared and nuclear magnetic resonance analysis indicated that it was 1,2,5,6 - tetrathia - 3,4,7,8-tetrakis(trifluoromethyl) cycloocta-3,7-diene,

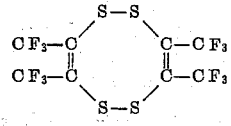

*Anal.*—Calc'd for $C_8F_{12}S_4$: C, 21.24; F, 50.40; S, 28.36; M.W., 452. Found: C, 21.57; F, 50.31; S, 27.96; M.W., 459.

*Example III*

A mixture of 25 g. (0.78 mole) of sulfur, 50 g. (0.31 mole) of hexafluorobutyne-2 and 40 g. (0.15 mole) of iodine was heated in an agitated vessel under autogenous pressure at 180° C. for 1 hour, then at 200° C. for 6 hours. Distillation of the liquid product gave 47.8 g. (84% conversion based on the hexafluorobutyne-2) of tetrakis(trifluoromethyl)thiophene, B.P. 131–134° C. at 760 mm., which was further identified by its nuclear magnetic resonance spectrum.

*Example IV*

A mixture of 25.6 g. (0.8 mole) of sulfur and 31 g. (0.19 mole) of hexafluorobutyne-2, without added catalyst, was heated at 220° C. under autogenous pressure for 7 hours. Distillation of the liquid product gave 7.1 g. of bis(trifluoromethyl)-1,2-dithietene (17% conversion), 4.1 g. of tetrakis(trifluoromethyl)thiophene (12% conversion) and 3.7 g. (10% conversion) of 1,4,5,8-tetrathiabicyclo[4.4.0] - 2,3,6,7,9,10-hexakis(trifluoromethyl)-deca-3,6-diene. All conversions are calculated on the basis of the hexafluorobutyne-2.

*Example V*

A mixture of 6.4 g. (0.20 mole) of sulfur and 20.8 g. (0.05 mole) of hexafluorobutyne-2-diiodide was heated at 170–185° C. under atmospheric pressure for 10 hours, during which time the bis(trifluoromethyl)-1,2-dithietene which formed was allowed to escape from the apparatus through a downward condenser. There was thus collected 6.1 g. (54% conversion based on the hexafluorobutyne-2-diiodide) of bis(trifluoromethyl)-1,2-dithietene, identified by its boiling point and nuclear magnetic resonance spectrum. On standing for about five weeks at room temperature, this product dimerized gradually to give, in 87% conversion, the crystalline dimer, 1,2,5,6-tetrathia-3,4,7,8-tetrakis(trifluoromethyl)cycloocta-3,7-diene.

*Example VI*

This example illustrates the reaction of hexafluorobutyne-2 with the vapors of boiling sulfur at ambient atmospheric pressure.

The apparatus was a round-bottomed glass reactor fitted at the top with two long upright glass tubes, one of which served as the inlet for the hexafluorobutyne-2 and, optionally, a carrier gas, and the other served as the outlet for the reaction product and as an air-cooled reflux condenser for the sulfur vapors. One hundred grams of sulfur was placed in the reactor, which was swept with nitrogen and heated to the boiling point of sulfur (445° C.). The sulfur vapors ascended in the outlet tube where they condensed, returning the molten sulfur to the vessel. A stream of gaseous hexafluorobutyne-2 (20 g.) was passed through the sulfur vapors in the reactor over a period of 13 minutes, concurrently with nitrogen at the rate of 1–2 ml./second. The reaction product was removed as it formed through the outlet tube and then passed through a downward condenser. There was obtained 28.6 g. of crude liquid condensate which, on fractionation, gave 15.1 g. of bis(trifluoromethyl)-1,2-dithietene and some higher boiling material.

Similar results are obtained when the hexafluorobutyne-2 is introduced gradually as a liquid, rather than as a gas, into the vapors of boiling sulfur.

*Example VII*

Using an apparatus similar to that of Example VI, 100 g. of sulfur was heated to the refluxing point at ambient atmospheric pressure in an atmosphere of nitrogen and 15.2 g. of bis(ω-hydroperfluoropentyl)acetylene, $$H(CF_2)_5—C\equiv C—(CF_2)_5H$$

was introduced gradually as a liquid into the sulfur vapors over a period of 10 minutes. After addition of this reactant, the system was swept with nitrogen to complete the removal of the reaction product. There was obtained 14.6 g. of crude liquid product which was dried and distilled to give 4.2 g. of unreacted bis(ω-hydroperfluoropentyl)acetylene, B.P. 51–53° C. at 5 mm., and 5.1 g. of a liquid boiling at 103–104° C. at 5 mm. This was identified by elemental analysis as bis(ω-hydroperfluoropentyl)-1,2-dithietene,

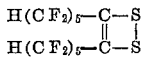

and the infrared, ultraviolet and nuclear magnetic resonance spectra agreed with this structure.

*Anal.*—Calc'd for $C_{12}H_2F_{20}S_2$: C, 24.42; H, 0.34; F, 64.38; S, 10.86. Found: C, 24.55; H, 0.53; F, 64.60; S, 10.57.

The bis(ω-hydroperfluoropentyl)acetylene used as the starting material in this example was prepared as follows:

(A) A mixture of 75 g. of ω-hydroperfluorovaleryl chloride, $H(CF_2)_4COCl$, 25 g. of nickel carbonyl and 26 g. of 1,1-difluoro-2,2-dichloroethylene was heated at 150° C. for 8 hours in a bomb. The reaction product was shaken with water and the lower layer was collected. The combined product from five preparations was distilled to give 70 g. of 1,12-dihydro-6,7-dichloroperfluoro-6-dodecene, $H(CF_2)_5CCl=CCl(CF_2)_5H$, B.P. 104–109° C. at 16 mm.

*Anal.*—Calc'd for $C_{12}H_2Cl_2F_{20}$: Cl, 11.88; F, 63.65. Found: Cl, 12.86; F, 62.28.

The nuclear magnetic resonance spectrum supported the assigned structure.

(B) To 3.68 g. of magnesium turnings in 20 ml. of tetrahydrofuran was added 15 ml. of a solution of 25.0 g. of $H(CF_2)_5CCl=CCl(CF_2)_5H$ in 100 ml. of tetrahydrofuran. Reaction soon set in at room temperature, and the mixture was cooled in an ice bath. The remainder of the halide solution was added at a rate of one drop per second, and the dark solution was then stirred for 2 hours at 0° C. A 75 ml. portion of the solvent was removed under reduced pressure, the excess magnesium was filtered off, and the filtrate was poured into 750 ml. of water. After breaking the emulsion with dilute sulfuric acid, the organic material was extracted with ether. Fractionation of the dried ether extracts gave 4.55 g. of bis(ω-hydroperfluoropentyl)acetylene as a colorless liquid, B.P. 71–76° C. at 18 mm., and 5.5 g. of a mixture of this product with the starting material.

*Anal.*—Calc'd for $C_{12}H_2F_{20}$: C, 27.39; H, 0.38; F, 72.22. Found: C, 27.71; H, 0.90; F, 71.90.

The nuclear magnetic resonance spectrum supported the assigned structure.

*Example VIII*

The procedure of Example VII was repeated, using as the organic reactant 29.5 g. of bis(ω-chlorotetrafluoroethyl)acetylene, $ClCF_2CF_2C\equiv CCF_2CF_2Cl$, which was introduced as a liquid over a period of 20 minutes into the vapors of 100 g. of boiling sulfur. Distillation of the liquid reaction product gave 11.8 g. of unreacted bis(ω-chlorotetrafluoroethyl)acetylene, B.P. 46–50° C. at 220 mm., and 17.7 g. of a liquid boiling at 98° C. at 40 mm. This was identified by elemental analysis as bis(ω-chlorotetrafluoroethyl)-1,2-dithietene,

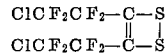

and the infrared, ultraviolet and nuclear magnetic resonance spectra agreed with this structure.

*Anal.*—Calc'd for $C_6Cl_2F_8S_2$: Cl, 19.75; F, 42.33; S, 17.86. Found: Cl, 19.58; F, 42.34; S, 18.08.

The bis(ω-chlorotetrafluoroethyl)acetylene used as the starting material in this example was prepared as follows:

(A) A mixture of 187 g. of 1,3,3,3-tetrachloro-1,1,2,2-tetrafluoropropane (which can be prepared as described by Coffman et al. in J. Am. Chem. Soc. 71, 979 (1949)) and 114 g. of copper powder was heated in an agitated bomb at 180° C. for 15 hours. The reaction product was extracted continuously with methylene chloride for 10 hours. Distillation of the extract gave 88 g. of 1,3,4,6-tetrachloro-1,1,2,2,5,5,6,6-octafluoro-3-hexene,

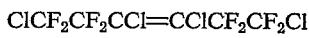

B.P. 95–98° C. at 100 mm.

*Anal.*—Calc'd for $C_6Cl_4F_8$: Cl, 31.77; F, 41.54. Found: Cl, 31.49; F, 41.55.

(B) A flask fitted with a stirrer, a dropping funnel and a short distilling column was charged with 20 g. of zinc dust and 60 ml. of acetic anhydride. The mixture was heated until the head temperature reached 135° C., and then a solution of 44.2 g. of

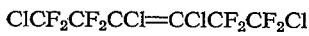

in 20 ml. of acetic anhydride was added in small portions over a period of four hours. During this time the reaction product was removed continuously at a head temperature of 83–93° C. There was obtained 36.5 g. of colorless distillate which was washed with water, 5% sodium bicarbonate and again with water to remove co-distilled acetic anhydride. After drying over sodium sulfate, the product was distilled, giving 25 g. of bis(ω-chlorotetrafluoroethyl)-acetylene, B.P. 82–84° C., $n_D^{24}$, 1.3210.

*Anal.*—Calc'd for $C_6Cl_2F_8$: C, 24.43; Cl, 24.04; F, 51.53. Found: C, 25.24; Cl, 24.44; F, 51.61.

The infrared and nuclear magnetic resonance spectra supported the assigned structure.

The polyfluorocyclic sulfides of this invention have a variety of uses. As a class, they are uninflammable and, in fact, extinguish combustion. They are therefore useful as fire-retardants and ingredients in fire-extinguishing compositions, whether they be solids or liquids. For example, tetrakis(trifluoromethyl)thiophene extinguishes a burning cotton wad soaked in xylene when sprayed on the fire. For the same reason, the liquid products, which have a high solvent power for a variety of organic compounds, provide solvents for use, for example, in insecticidal compositions. The bis(polyfluoroalkyl)-1,2-dithietenes and their dimers are useful as rubber-curing agents and vulcanization accelerators. The dimers also find use as flame-resistant ingredients in waxes and as softeners for fluorinated polymers such as polytetrafluoroethylene. The polyfluoroalkylthiophenes possess remarkable resistance to heat and light and find use as heat-exchange liquids.

The bis(polyfluoroalkyl)-1,2-dithietenes are versatile sources of useful chemicals through their ability to add to compounds containing ethylenic or acetylenic unsaturation. As has been shown, the reaction of sulfur with a bis(polyfluoroalkyl)acetylene gives as a by-product a bicyclic sulfide which is an adduct of one mole of the bis-(polyfluoroalkyl)acetylene to two moles of the bis(polyfluoroalkyl)-1,2-dithietene. It is also possible to obtain mole-for-mole adducts of the dithietenes to acetylenic compounds. For example, heating at 100° C. for a few hours a mixture of bis(trifluoromethyl)-1,2-dithietene with hexafluorobutyne-2 gives the molar adduct, 1,4-dithia-2,3,5,6 - tetrakis(trifluoromethyl)cyclohexa-2,5-diene. Similarly, bis(polyfluoroalkyl)-1,2-dithietenes and ethylenic compounds give molar adducts with the structure of 1,4-dithia-2,3-polyfluoroalkyl-2-cyclohexenes. Such an adduct has been obtained, for example, by refluxing for a few hours a mixture of bis(trifluoromethyl)-1,2-dithietene and cyclohexene. These adducts are claimed elsewhere.

The bis(polyfluoroalkyl)-1,2-dithietenes and their dimers are further useful as inhibitors of vinyl polymerization. For example, both bis(trifluoromethyl)-1,2-dithietene and 1,2,5,6-tetrathia-3,4,7,8-tetrakis(trifluoromethyl)cycloocta-3,7-diene inhibited the polymerization of styrene by ultraviolet light when present in the styrene in about 5% concentration, whereas a control sample of uninhibited styrene polymerized to a viscous oil under the same conditions. The same compounds prevented the polymerization of vinyl acetate with α,α'-azobis(α,γ-dimethylvaleronitrile) as initiator, whereas a control sample with the same initiator but without the cyclic fluorosulfides polymerized to a glassy solid.

Since obvious modifications in the invention will be evident to those skilled in the chemical arts, I propose to be bound solely by the appended claims.

The embodiments of the invention in which an exclusive property or privilege is claimed are defined as follows:

1. A tetrakis(polyfluoroalkyl)thiophene having the formula

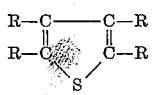

wherein each R is selected from the group consisting of perfluoroalkyl, ω-hydroperfluoroalkyl and ω-chloroperfluoroalkyl of 1–12 carbon atoms.

2. A bis(polyfluoroalkyl)-1,2-dithietene having the formula

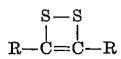

wherein each R is selected from the group consisting of perfluoroalkyl, ω-hydroperfluoroalkyl and ω-chloroperfluoroalkyl of 1–12 carbon atoms.

3. A 1,2,5,6-tetrathia-3,4,7,8-tetrakis(polyfluoroalkyl)-cycloocta-3,7-diene having the formula

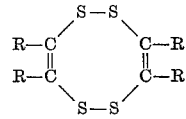

wherein each R is selected from the group consisting of perfluoroalkyl, ω-hydroperfluoroalkyl and ω-chloroperfluoroalkyl of 1–12 carbon atoms.

4. Tetrakis(trifluoromethyl)thiophene.
5. Bis(trifluoromethyl)-1,2-dithietene.
6. 1,2,5,6-tetrathia - 3,4,7,8 - tetrakis(trifluoromethyl)-cycloocta-3,7-diene.
7. Bis(ω-hydroperfluoropentyl)-1,2-dithietene.
8. Bis(ω-chlorotetrafluoroethyl)-1,2-dithietene.
9. The process which comprises heating, at a temperature of about 150–475° C., a mixture of sulfur and a compound of the formula R—C≡C—R where each R is selected from the group consisting of perfluoroalkyl, ω-hydroperfluoroalkyl, and ω-chloroperfluoroalkyl of 1–12 carbon atoms, and forming as a resulting product an unsaturated, polyfluorinated heterocyclic sulfide.

10. The process which comprises heating, at a temperature of about 150–475° C., a mixture of sulfur, iodine, and a compound of the formula R—C≡C—R where each R is selected from the group consisting of perfluoroalkyl, ω-hydroperfluoroalkyl and ω-chloroperfluoroalkyl of 1–12 carbon atoms, and forming as a resulting product an unsaturated, polyfluorinated heterocyclic sulfide.

11. The process which comprises heating, at a temperature of about 150–475° C., a mixture of sulfur, iodine in amount between 0.05 and 0.25 mole per mole of sulfur, and a compound of the formula R—C≡C—R where each R is selected from the group consisting of perfluoroalkyl, ω-hydroperfluoroalkyl and ω-chloroperfluoroalkyl of 1–12 carbon atoms, and forming as a resulting product an unsaturated, polyfluorinated heterocyclic sulfide.

12. The process which comprises heating, at a temperature of about 175–450° C., a mixture of sulfur, iodine in amount between 0.05 and 0.25 mole per mole of sulfur, and a compound of the formula R—C≡C—R where each R is selected from the class consisting of perfluoroalkyl, ω-hydroperfluoroalkyl and ω-chloroperfluoroalkyl of 1–12 carbon atoms, and forming as a resulting product an unsaturated, polyfluorinated heterocyclic sulfide.

13. The process which comprises heating, at a temperature of about 150–475° C., a mixture of sulfur and a compound of the formula R—Cl=Cl—R wherein each R is selected from the group consisting of perfluoroalkyl, ω-hydroperfluoroalkyl and ω-chloroperfluoroalkyl of 1–12 carbon atoms, and forming as a resulting product an unsaturated, polyfluorinated heterocyclic sulfide.

14. The process which comprises heating, at a temperature of about 175–450° C., a mixture of sulfur and hexafluorobutyne-2, and forming as a resulting product at least one unsaturated heterocyclic fluorocarbon sulfide selected from the class consisting of bis(trifluoromethyl)-1,2-dithietene and tetrakis(trifluoromethyl)thiophene.

15. The process which comprises heating at a temperature of about 150–475° C., a mixture of sulfur, iodine in amount between 0.05 and 0.25 mole per mole of sulfur, and hexafluorobutyne-2, and forming as a resulting product at least one unsaturated heterocyclic fluorocarbon sulfide selected from the class consisting of bis(trifluoromethyl)-1,2-dithietene and tetrakis(trifluoromethyl)thiophene.

16. The process which comprises heating, at a temperature of about 150–475° C., a mixture of sulfur and hexafluorobutyne-2 diiodide, and forming as a resulting product at least one unsaturated heterocyclic fluorocarbon sulfide selected from the class consisting of bis(trifluoromethyl)-1,2-dithietene and tetrakis(trifluoromethyl)thiophene.

17. The process which comprises heating, at a temperature of about 150–475° C., a mixture of sulfur and bis(ω-hydroperfluoropentyl)acetylene, and forming as a resulting product bis(ω-hydroperfluoropentyl)-1,2-dithietene.

18. The process which comprises heating at a temperature of about 150–475° C., a mixture of sulfur and bis(ω-chlorotetrafluoroethyl)acetylene, and forming as a resulting product bis(ω-chlorotetrafluoropentyl)-1,2-dithietene.

References Cited in the file of this patent
UNITED STATES PATENTS

| 2,613,214 | Pines | Oct. 7, 1952 |
| 2,625,553 | Pines | Jan. 13, 1953 |

UNITED STATES PATENT OFFICE
CERTIFICATE OF CORRECTION

Patent No. 3,052,691 September 4, 1962

Carl G. Krespan

It is hereby certified that error appears in the above numbered patent requiring correction and that the said Letters Patent should read as corrected below.

Column 10, line 60, for "chlorotetrafluoropentyl" read -- chlorotetrafluoroethyl --.

Signed and sealed this 5th day of February 1963.

(SEAL)
Attest:

ERNEST W. SWIDER
Attesting Officer

DAVID L. LADD
Commissioner of Patents